United States Patent [19]
Ellmore

[11] 3,813,590
[45] May 28, 1974

[54] AUTOMATIC REVERSING CONTROL EQUIPMENT

[75] Inventor: John W. Ellmore, West Chester, Pa.

[73] Assignee: Allister Manufacturing Company, Inc., Exton, Pa.

[22] Filed: Aug. 31, 1973

[21] Appl. No.: 393,283

[52] U.S. Cl................. 318/266, 318/282, 318/468
[51] Int. Cl. ............................................. H02p 1/42
[58] Field of Search ........... 318/267, 282, 468, 266

[56] References Cited
UNITED STATES PATENTS

| | | | |
|---|---|---|---|
| 2,751,219 | 6/1956 | Dodge | 318/266 |
| 2,992,819 | 7/1961 | Jackson | 318/267 X |
| 3,048,761 | 8/1962 | Purdy | 318/267 X |
| 3,204,170 | 8/1965 | Monks | 318/267 |
| 3,498,434 | 3/1970 | Richmond | 318/468 X |
| 3,611,083 | 10/1971 | Halsted | 318/207 A |

*Primary Examiner*—B. Dobeck
*Attorney, Agent, or Firm*—Synnestvedt & Lechner

[57] ABSTRACT

Control equipment for a reversible electric motor for driving a mechanism such as a garage door operator. The control equipment includes a pressure responsive device for moving a movable switch element between first and second motor energizing positions in a circuit. The movable switch element in one of the circuit positions conditions the motor for operation in one direction, and in the other of the circuit positions conditions the motor for operation in another direction. The equipment further includes a relay normally selectively energizable by an operator controlled switch to alternately complete first or second motor energizing circuit paths, depending upon the position of the switch element, to permit movement of the mechanism in the direction desired. In order to reverse the door when it encounters an obstruction, a circuit is provided to the relay which bypasses the operator controlled switch. The pressure responsive device first operates a bypass switch in the bypass circuit and then moves the aforesaid movable switch element to the one of its positions which conditions the motor for operation in a direction reversed to the direction in which the motor was operating at the time the obstruction was encountered. Simultaneously, the movable switch element closes contacts which complete the bypass circuit, thereby energizing the relay to complete the motor circuit causing the motor to operate in the reverse direction. Means are provided for disabling the bypass switch, thereby preventing energization of the relay via the bypass circuit at limits of door travel. First and second thermal cutouts are provided for controlling operation of the motor.

14 Claims, 5 Drawing Figures

AUTOMATIC REVERSING CONTROL EQUIPMENT

BACKGROUND OF THE INVENTION

This invention relates to an automatic reversing control circuit for a reversible electric motor useful, for example, for automatically opening and closing a garage door. More specifically, the invention relates to a control circuit which automatically reverses the direction of rotation of the motor when the door or other member encounters an obstruction.

A readily apparent danger connected with the use of automatic garage door operators is injury to people, objects or the operating mechanism itself should the door strike an obstruction while being opened or closed. The danger is acute with children who may "play" with the operating device and accidentally cause the door to strike or injure either themselves or playmates.

Prior devices for automatically reversing the direction of movement of driven members upon encountering a restraint or obstruction include devices found in U.S. Pat. Nos. 3,204,170, 3,199,857 and 3,611,083. The former patent discloses a screw along which a motor and carriage reciprocates in opening and closing a garage door. The screw is mounted at one end in resilient material which allows the screw to move along its axis in response to a door obstruction which impedes movement of the motor and carriage. Screw movement causes the motor to reverse its direction. In the latter two patents, the element sensing an obstruction is a centrifugal switch that senses the increased or decreased motor speed due to slip clutch action caused by interruption of the movement of members such as garage doors driven by the motor. An example of another prior device which stops the motor upon the door or driven member encountering an obstruction is found in U.S. Pat. No. 2,751,219.

SUMMARY AND OBJECTS OF THE INVENTION

It is an important object of this invention to provide a simplified and reliable means for stopping and reversing a mechanism such as a door operator when the door encounters an obstruction.

It is a more specific object of this invention to provide a safety device which can be used with reversible drive mechanisms such as a garage door operator to automatically reverse the direction of the drive mechanism when the door strikes an object.

A still further object of this invention is to provide the desired control with a minimum number of circuit components and mechanical parts being required.

Yet another object of the invention is the provision of thermal cutout means including first and second thermal cutouts for controlling operation of the motor.

The above objects and others are accomplished with control equipment including a pressure responsive device for moving a first switch means, having contact poles, between first and second positions; and a second switch means moved by a selectively energized relay alternately between first and second positions. The first positions of the first and second switch means complete a first motor energizing circuit path; and the second positions, a second motor energizing circuit path which reverses the motor. The control equipment further includes an operator controlled switch for energizing said relay and a bypass circuit for bypassing the operator controlled switch including, in series, a contact pole of said first switch means, the relay and a third switch means; means for holding said third switch means open; and means for disabling said holding means. The holding and disabling means are operatively associated with the pressure responsive means so that movement of the pressure responsive means upon obstruction of door movement closes the third switch means. Movement of the pressure responsive means thereafter moves the first switch means to its second position, thereby completing the bypass circuit to energize the relay to move the second switch means to its second position. This completes the second motor energizing circuit and reverses the motor driven door. Limit members are affixed to the drive mechanism. Means are provided to prevent operation of the third switch means at limits of door travel. A first thermal cutout is located in the motor circuit. A second thermal cutout operates at a lower temperature than the first cutout and is located in series with the operator controlled switch.

Further objects and advantages of the present invention will be apparent from the following detailed description of the preferred embodiments thereof made with reference to the accompanying drawings forming a part of the specification and in which.

DETAILED DESCRIPTION OF THE PREFERRED EMBODIMENTS

Although the invention may be used for other purposes, a preferred application is as a safety device for garage door operators.

Figure 1:
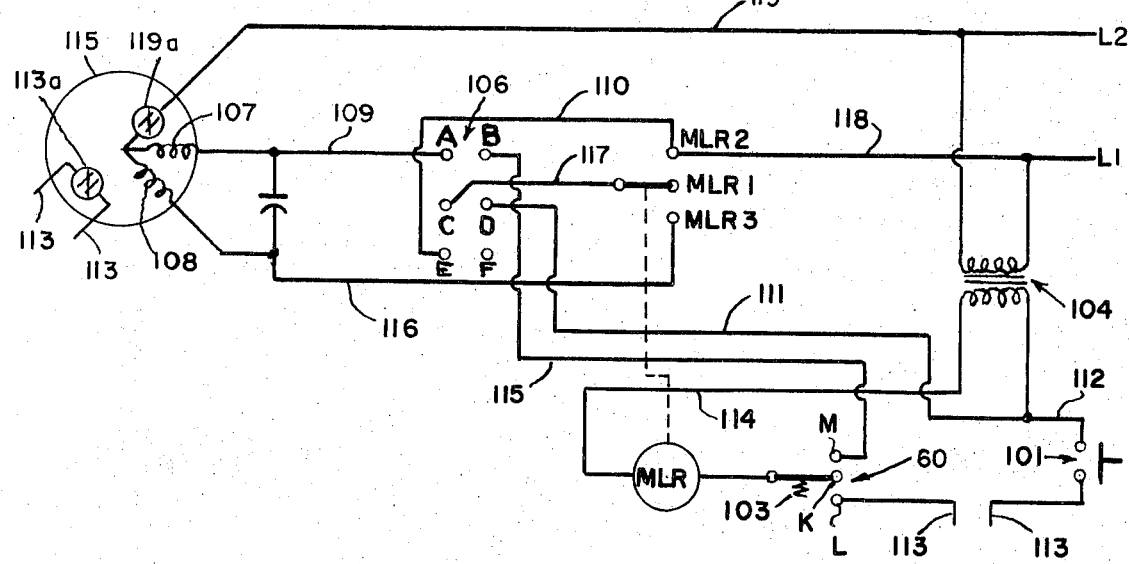
FIG. 1 is a control circuit diagram illustrating one embodiment of the invention.

Referring now to FIG. 1, there is schematically illustrated two lines L1 and L2 which represent an alternating current power source. A reversible motor 105 which is preferably a three lead, instantly reversible, permanent split capacitor motor having windings 107 and 108, is connected to L2 by lead 119. Current flowing through winding 107 causes the motor to rotate in a direction opposite to the direction of movement when current flows through the winding 108.

In the illustrative embodiment, a first switch means comprising stationary switch contacts A and E and movable contact C of a double pole double throw switch 106 completes circuit paths so that winding 107 or 108 may be energized. Second switching means comprised of latching relay MLR having contacts MLR1, MLR2 and MLR3 completes a circuit path to the appropriate winding. The path through winding 107 to L1 includes lead 109, contact A and movable contact C of double pole double throw switch 106, lead 117, contacts MLR1 and MLR2 of latching delay MLR and lead 118. The circuit path through winding 108 to L1 comprises lead 116, contacts MLR3 and MLR1 of latching relay MLR, lead 117, contacts C and E of the switch 106, lead 110, and lead 118.

Relay MLR alternately moves contact MLR1 into contact with stationary contacts MLR2 or MLR3, one contact being made upon each energization of coil MLR. The relay coil is in series electrical connection with a selectively energizable operator controlled switch 101 operable manually or by remote control via a circuit including lead 113, bypass switch 60 in a first operative position in which its contacts K and L are in electrical connection, lead 114, the secondary of transformer 104 and lead 112.

A bypass circuit provides an alternate circuit path to relay MLR in accordance with the invention and includes the above-mentioned bypass switch 60 in a second operative position in which its contacts K and M are electrically connected, lead 114 and the secondary of transformer power source 104, lead 111, movable contact D and stationary contact B of the double pole double throw switch 106. In the embodiment of FIG. 1, the bypass switch 60 is biased to its second operative position but is held in its first operative position in which the alternate circuit path is open and the coil of latching relay MLR can be energized by switch 101. The conditions under which the switch 106 is moved to the position in which the alternate circuit path is closed will be described hereinafter.

Pressure responsive means associated with the door or other motor driven mechanism is provided for controlling the position of contacts C and D of first switch means 106, and for causing third or bypass switch means 60 to assume first or second operative positions.

Figure 2:
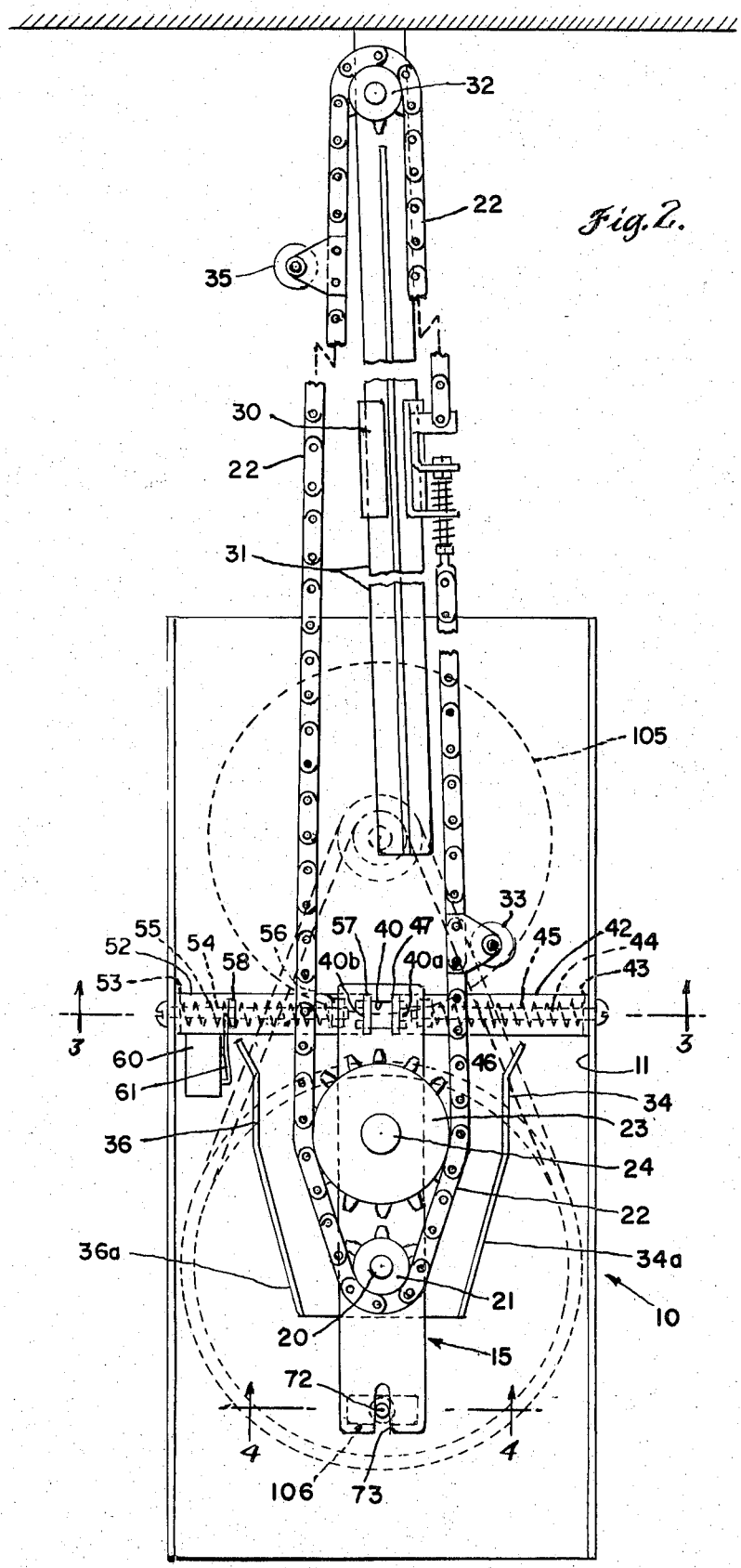
FIG. 2 is a top plan view of door operated pressure responsive equipment for operating components of the control circuit.

A housing 10 shown in FIG. 2 is typically mounted on the ceiling adjacent the door and houses the reversible electric motor, various circuitry and accessories such as a radio control receiver, electrical outlets, light fixtures, etc. Looking down upon the top of housing 10, there can be seen the pressure responsive means preferred for use in the practice of the invention.

The pressure responsive means preferably comprises a pivotal member or lever 15 mounted on motor driven drive shaft 20 for pivotal movement with respect thereto. A toothed drive sprocket 21 is keyed or otherwise secured to the shaft 20 adjacent the pivotal member. Drive sprocket 21, in turn, drives a continuous flexible drive member such as roller chain 22. Chain 22 passes over a load or pressure sensing idler sprocket 23 rotatably mounted on shaft 24 affixed to pivotal member 15. The load sensing idler sprocket 23 has a larger diameter than drive sprocket 21.

A carrier 30 rides upon a guide rail 31 and is attached to the chain 22 for movement thereby. The carrier 30 is normally connected to the garage door by linkage means (not shown). Limit rollers 33 and 35 are also attached to chain 22 for purposes to be described hereinafter. Chain 22 and components added thereto form a continuous loop with chain 22 rotating freely about a pulley 32 typically affixed to the garage wall above the garage door opening.

Pivotal movement of the lever member about the motor shaft 20 results whenever an obstruction is encountered by the drive system. When the chain is traveling in the counterclockwise direction as viewed in FIG. 2 and an obstruction is encountered, a force will be exerted by the chain against the lefthand side of idler sprocket 24 as the drive sprocket 21 tensions the chain when it attempts to rotate further in the counterclockwise direction. This force causes clockwise pivotal movement of the lever about the shaft 20. Conversely, when the chain encounters an obstruction when it is moving in a clockwise direction, drive sprocket 21 exerts a tension on the righthand portion of the chain causing a force to be exerted against the righthand side of the idler sprocket thereby pivoting the lever 15 in the counterclockwise direction. The purpose of this will become apparent hereinafter.

Means including camming plates or tracks stop the door at each of its limits of travel. Camming plate 34 is positioned to receive limit roller 33 as the door approaches one limit of travel. The camming plate is provided with an inclined portion 34a onto which the limit roller 33 rides causing pivotal movement of the lever 15 at the limit of movement of the door. Camming plate 36 is also provided with an inclined portion 36a and is positioned to receive the limit roller 35 as the other limit of travel is approached. At the limit of travel, limit roller 35 moves onto the inclined portion of the camming plate 36 and when it does this causes pivotal movement of the lever 15 in a clockwise direction.

Figure 3:
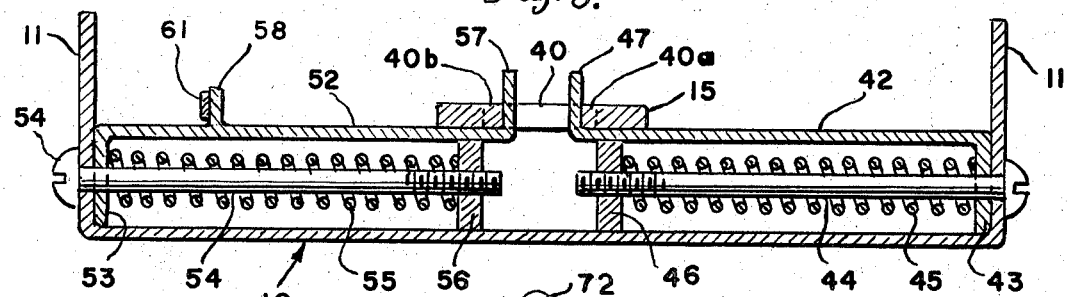
FIG. 3 is an enlarged sectional view taken along line 3—3 of FIG. 2.

The pressure responsive means further includes biased follower members for urging pivotal member 15 to the central position shown in FIGS. 2 and 3. The biased follower members preferably include arm 42 having an upturned flange 47 at its inner end and arm 52 having an upturned flange 57 at its inner end. The arms are movably connected to pivotal member 15 by connecting means such as spaced tabs 40a and 40b in the rectangular opening 40 of the pivotal member 15.

Referring to FIG. 3, follower member 42 includes a flange 43. A rod or bolt 44 passes through a hole in wall 11. A spring 45 fit onto the shank of bolt 44 is retained by nut 46. Spring 45 bears against the flange 43. Follower member or arm 52 is biased by a spring 55 which fits on the shank of bolt 54 between flange 53 and a nut 56.

Figure 4:
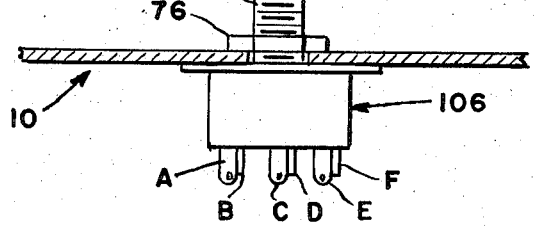
FIG. 4 is an enlarged sectional view taken along line 4—4 of FIG. 2.

As can be seen in FIGS. 3 and 4 the pivotal member 15 operates the first switch means 106 by means of a slot 73 which receives toggle element 72. The switch 106, as illustrated in FIG. 4, is secured underneath the pivotal element 15 by means of threaded neck 75 and threaded collar 76. The toggle element 72 is a part of the movable element of the double pole double throw switch means 106.

It should be readily apparent that the pivoting of member 15 clockwise will throw toggle 72 to the left and that the counterclockwise pivoting of member 15 will throw toggle 72 to the right; thereby effecting movement of the movable element of the double pole double throw switch 106.

In the embodiment of FIG. 1, the third switch means comprises bypass switch 60 which is a snap action single pole double throw switch, located adjacent the arm 52. A switch operating arm 61, spring biased to its second operative position with contacts K and L in contact in the absence of restraint, is normally held in its first operative position by holding means comprising a projection 58 on arm 52 as can be seen in FIG. 3. When pivotal member 15 rotates clockwise, it moves arm 52 to the right via tab 40b and projection 58. Projections 58 on the arm 52 also moves out of contact with switch arm 61, allowing the switch 60 to assume its second operative position. Because the switch 60 is located at a point more remote from the pivotal axis of member 15 than the toggle of switch 106, switch 60 will assume its second operative position before switch 106 is thrown. It should also be noted that when member 15 rotates in the counterclockwise direction from the central position, projection 58 does not move.

Motor 105 is provided with a normally closed thermal switch 119a which is located in the motor housing in line 119. Switch 119a opens at a preselected temperature, in the event a malfunction in the mechanism occurs which causes the motor to overheat. A feature of the invention is the provision of a second normally closed thermal switch 113a which is also located in the motor housing in series circuit relationship with switch 101. Thermal switch 113a is set to open at a temperature somewhat below the operating temperature of thermal switch 119a which opens to prevent operation of the motor by switch 101 when the temperature of the motor reaches the operating temperature of the thermal switch. The importance of this feature of the invention arises when the push button switch 101 is operated several times in a short period of time. Its operation prevents further operation of switch 101 until the motor has cooled down sufficiently. If thermal switch 119a opens while the door is in mid-travel, the door will continue to move to its limit of travel unless a condition of genuine emergency which would also open thermal switch 119a has been created.

A brief explanation of the functioning of the motor control equipment of the present invention will now be given with an arbitrary starting point being with the door in the fully closed position. When the garage door is closed the movable contacts C and D are in contact with stationary posts A and B, respectively; the movable relay contact MLR1 is in contact with contact MLR3; and contact K is in contact with stationary contact L of the bypass switch 60. When selectively energizable switch 101 is momentarily closed, lead 112 is in electrical connection with lead 113, coil MLR and lead 114 and coil MLR of the latching mechanical relay is energized. Movable relay contact MLR1 is thereby brought into contact with stationary contact MLR2. Thus a circuit is closed comprising L1, lead 118, contacts MLR2 and MLR1, lead 117, contacts C and A, lead 109, winding 107, lead 119, and L2. The energized motor operates to drive chain 22 in FIG. 2 in a clockwise direction so that the door begins to open. The opening door may be stopped by again depressing switch 101 which causes the movable contact MLR1 to disengage from contact MLR2 and make contact with stationary contact MLR3, thus interrupting the motor circuit and causing the door to stop.

To close a fully opened and stopped garage door, switch 101 is momentarily closed to energize latching relay MLR causing movable contact MLR1 to be switched from stationary contact MLR2 to stationary contact MLR3. This completes a circuit from L1, comprising lead 118, lead 110, contacts C and E, lead 117, contacts MLR1 and MLR3, lead 116, motor winding 108, lead 119, to L2. The now energized motor rotates in a direction opposite to the previous direction; that is, chain 22 (FIG. 2) is driven in a counterclockwise direction so as to close the door. During closing, switch 101 (FIG. 1) is momentarily closed to cause movable contact MLR1 to move from stationary contact MLR3 to stationary contact MLR2, the door closing circuit is interrupted causing the door to stop.

At fully opened and closed door positions, the motor automatically stops when the appropriate limit roller 33 or 35 engages the corresponding limit cam 34 or 36, mechanically pivoting member 15 as above described. Pivoting member 15 moves toggle 72 and moves the contacts C and D from one position to the other, thereby breaking the motor energizing circuit and stopping the motor.

When the door encounters an obstruction intermediate its limits of travel, the following sequence takes place. Assuming that the garage door is closing, if an obstruction is met by the closing door, the lefthand part of the counterclockwise rotating chain (as viewed in FIG. 2) undergoes an increase in tension and exerts an increased load against idler 23 causing member 15 to pivot in a clockwise direction about drive shaft 20. The clockwise rotation of member 15 moves contact D of switch 106 against contact B and contact C against contact A causing the motor to momentarily stop. It next causes projection 58 on arm 52 to move out of contact with arm 61 of switch 60 thereby allowing movable contact K to move into contact with stationary contact M of switch 60, thus closing the bypass circuit. Relay MLR is then energized since the bypass circuit is completed by means of lead 115, contacts K-M, the coil of latching relay MLR, lead 114, the secondary of transformer 104 and lead 111. Energizing the coil of latching relay MLR causes contact MLR1 to move from stationary contact MLR3 to stationary contact MLR2. A circuit is now completed from L1, comprising lead 118, lead 117, lead 109, motor winding 107 and lead 119 to L2 so that the motor reverses and the door moves to the full open position where it automatically stops as described previously.

An aspect of the invention is that means are provided to disarm the switch 60 when the lever 15 pivots when the door is in a full closed position. To accomplish this, the end of down limit cam 36 is made sufficiently flexible so that as the down limit roller 35 engages the down limit cam 36, the cam flexes outwardly holding the switch in its first condition with contact K against contact L.

If the door encounters an obstruction while opening, the righthand part of the rotating chain (as viewed in FIG. 2) is tensioned and causes the member 15 to pivot in a counterclockwise direction moving contacts C and D against contacts E and F. This breaks the circuit to the motor winding automatically stopping the motor and door. During this time switch 60 is held in its first operative position since extension 58 of arm 52 remains in contact with extension 61. Momentary closing of switch 101 will energize coil MLR to bring contact MLR1 into contact with contact MLR3. The door closing circuit previously described is completed and the door is lowered away from the obstruction encountered in opening.

Figure 5:
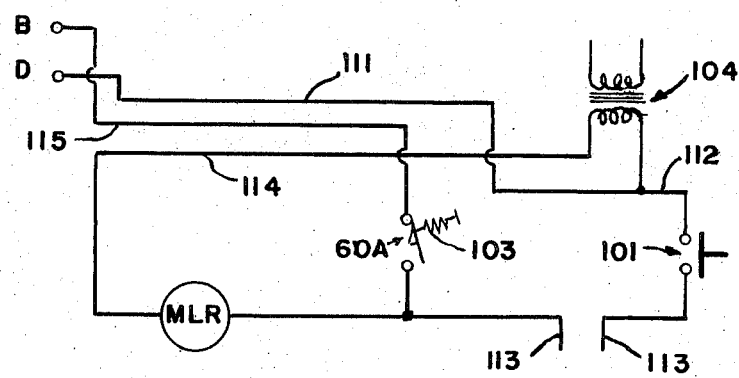
FIG. 5 is a circuit diagram illustrating a bypass circuit of another embodiment of the invention.

In a second embodiment of the invention, which may be preferably under certain conditions of use of the invention, the switch 60 is replaced with a normally closed switch 60A that is held open as shown in FIG. 5. FIG. 5 depicts a bypass circuit utilizing such a normally closed switch 60A. The bypass circuit performs all of the functions of that in FIG. 1 except that the operator controlled switch 101 is not isolated from the coil MLR when the bypass circuit closes. In cold climates where a layer of ice and snow several inches thick might accumulate in the path of an open door, push button switch 101 is not disabled when an obstruction is encountered so that the embodiment of FIG. 2 given the operator the freedom to override the automatic reversing feature and stop the door when such an accumulation is encountered.

I claim:

1. Control equipment for a reversible electric motor for driving a mechanism between first and second limits of travel comprising a motor circuit, a first switch means operable in a first position for conditioning a motor circuit path for operation of the motor in a first direction and in a second position for conditioning a motor circuit path for operation of the motor in the reverse direction, second switch means for completing said circuit, a relay for operating said second switch means, said second switch means being operable to complete the circuit path conditioned for operation by said first switch means, operator controlled means for energizing said relay to cause said second switch means to complete the conditioned circuit path, pressure responsive means for moving said first switch means from one to the other of its positions, a bypass circuit for energizing said relay independently of the operator controlled means, said first switch means including a contact in said bypass circuit, said contact being movable to a bypass circuit closing condition upon movement of the first switch means to one of said positions, said bypass circuit including a third switch means, said third switch means being movable in response to movement of said pressure responsive means when the mechanism is intermediate its limits of travel to close the bypass circuit when said contact is in circuit closing condition thereby energizing the relay, and means associated with said pressure responsive means for preventing movement of said third switch means to bypass circuit closing condition when the mechanism reaches its limits of travel.

2. The control equipment according to claim 1 wherein said relay comprises a latching relay.

3. Control equipment according to claim 1 wherein said third switch means is movable to bypass closing condition prior to movement of the first switch means to said one position when the pressure responsive means is operated when the mechanism is intermediate its limits of travel.

4. The control equipment according to claim 1 wherein said third switch means includes means for disabling said operator controlled means from energizing said relay when said third switch means closes said bypass circuit.

5. The control equipment according to claim 4 wherein said third switch means comprises a single pole-double throw switch, said single pole-double throw switch in a first operative position closing a circuit path from said operator controlled means to said relay and in a second operative position opening said circuit path from said operator controlled means to said relay and closing a circuit path from said contact to said relay when said contact is in circuit closing condition.

6. The control equipment according to claim 1 wherein said third switch means comprises a switch biased to the closed position at which closed position said biased switch closes a circuit path from said contact to said relay when said contact is in circuit closing position, and wherein said operator controlled means remains capable of energizing said relay irrespective of whether said normally closed switch is in its opened or closed position.

7. The control equipment according to claim 1 wherein said first switch means comprises a double pole-double throw switch.

8. The control equipment according to claim 1 further including holding means operatively associated with said pressure responsive means for allowing movement of said third switch means only upon said mechanism encountering an obstruction while moving in a predetermined direction intermediate its limits of travel.

9. The control equipment according to claim 1 wherein said pressure responsive means comprises a drive member in motion transmitting association with said motor and said mechanism, and wherein said means for preventing movement of said third switch means comprises a limit roller secured to said drive member and a camming track adapted to engage said limit roller and be deflected thereby into contact with said third switch means.

10. The control equipment according to claim 1 wherein said pressure responsive means comprises a flexible drive member in motion transmitting association with said motor and said mechanism, a pivotal member, and pressure sensing means mounted on said pivotal member and in contact with said flexible drive member for urging pivoting of said pivotal member in response to forces exerted by said flexible drive member upon obstruction of movement of said mechanism.

11. The control equipment according to claim 10 further including biased follower means for urging said pivotal member to a central position.

12. Control equipment according to claim 1, further including first and second thermal switches in said motor, said first switch being connected in said motor circuit to break said motor circuit when an upper limiting temperature is reached, said second thermal switch being connected in circuit with said operator controlled means to prevent operation of said relay by said operator controlled means when a limiting temperature below said upper limiting temperature is exceeded.

13. In a drive mechanism of the type wherein a reversible electric motor drives a member such as a door or the like between limits of travel and is controlled by circuitry having a double pole-double throw switch and a single pole-double throw relay switch, both of said switches in a first operative position completing a first motor energizing circuit path and in a second operative position completing a second motor energizing circuit path energizing said motor in a direction opposite to the motor direction of the first circuit path; wherein said relay switch is changed from one to another of its positions upon energization of a relay coil circuit having in series electrical connection a relay coil, a selectively closable switch and a power source; and wherein said double pole-double throw switch is moved from one to another of its positions by a device responsive to pressure including pressure created by obstruction of member movement, the combination with said circuitry and pressure responsive device of a circuit bypassing said selectively operable switch and having in series electrical connection said relay coil, two poles of said double pole-double throw switch electrically connected in the second position thereof, and a switch biased to the closed position held by said pressure responsive device in the open position and upon obstruction of member movement allowed by said pressure responsive device to close so that upon obstruction of member movement and movement of said double pole-double throw switch from the first to the second of its positions, said first motor energizing circuit is opened and the bypassing circuit is closed thereby energizing the relay coil to move the relay switch from the first to the second of its positions to thereby complete said second motor energizing circuit.

14. The drive mechanism according to claim 13 further including means associated with said pressure responsive device for preventing the closing of said bypass circuit biased switch at said limits of travel.

* * * * *

UNITED STATES PATENT OFFICE
CERTIFICATE OF CORRECTION

Patent No. 3,813,590        Dated   May 28, 1974

Inventor(s) John W. Ellmore

It is certified that error appears in the above-identified patent and that said Letters Patent are hereby corrected as shown below:

Abstract - second sentence --is disclosed-- should be added after "operation".

Column 1, Line 19 "or" should read --and--

Column 1, Line 25, "former" should read --instead of first--

Column 1, Line 64, "second switch means complete" should read --second switch means effect completion of--

Column 1, Line 66 "circuit path; and the second positions a" should read --circuit path which operates the motor in one direction. The second switch positions effect completion of a --

Column 2, Line 66 "117" should read --112--

Column 2, Line 66 reads "delay" should read --relay--

Column 3, Line 28 "Pressure responsive means" should read --As shown in Fig. 2, pressure responsive means--

Column 3, Line 67 "sprocket 24" should read --sprocket 23--

Column 4, Line 32 "tabs 40a and 40b in the" should read --tabs 40a and 40b provided in the--

UNITED STATES PATENT OFFICE
CERTIFICATE OF CORRECTION

Patent No. 3,813,590　　　　　　　　Dated May 28, 1974

Inventor(s) John W. Ellmore

It is certified that error appears in the above-identified patent and that said Letters Patent are hereby corrected as shown below:

Column 4, Line 36 "A spring 45 fit onto"

should read --A spring 45 fitted onto--

Column 5, Line 4 "that when member 15"

should read --that when pivotal member 15--

Column 5, Line 22 "Its operation prevents further"

should read --Operation of the thermal switch 113a prevents further--

Column 5, Line 23 "operation of switch 101"

should read --operation of the relay MLR by switch 101--

Column 5, Line 25 "119a" should read --113a--

Column 5, Line 64 "after "closing,", insert -- if -- .

Column 6, Line 20 --However, prior to this, rotation of the member 15 has caused -- should be inserted for "It next causes"

Column 7, Line 3 "given" should read --gives--
Column 7, Line 18 after "controlled" insert --switch--
Column 8, Line 52 after "motor" insert --for rotation--

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents